United States Patent [19]

Carlsson

[11] 4,354,548
[45] Oct. 19, 1982

[54] DEVICE FOR HEATING LIQUID FOR ONE OR SEVERAL WASHER SYSTEMS

[76] Inventor: Bror-Erland Carlsson, Falkmansgatan 6, S-311 00 Falkenberg, Sweden

[21] Appl. No.: 32,443

[22] Filed: Apr. 23, 1979

[30] Foreign Application Priority Data

Apr. 24, 1978 [SE] Sweden ............... 7802170
Mar. 13, 1979 [SE] Sweden ............... 7902231

[51] Int. Cl.³ .......................... F28D 7/10; F28F 9/22
[52] U.S. Cl. ............................ 165/41; 165/156; 165/169; 237/12.3 B; 239/130
[58] Field of Search ............... 165/156, 163, 169, 170, 165/51, 41; 239/129, 130, 284 R, 284 A; 237/12.3 B, 12.3 R

[56] References Cited

U.S. PATENT DOCUMENTS

| | | | |
|---|---|---|---|
| 921,811 | 5/1909 | Deckebach | 165/156 |
| 2,260,904 | 10/1941 | Horton | 239/130 |
| 2,653,014 | 9/1953 | Sniader | 165/169 |
| 3,086,358 | 9/1963 | Tumavicus | 165/51 X |
| 3,318,376 | 5/1967 | Vihl | 165/169 |
| 3,335,790 | 8/1967 | Aranyi et al. | 165/163 |
| 3,632,042 | 7/1972 | Goulish et al. | 239/284 X |
| 3,739,842 | 6/1973 | Whalen | 165/169 |
| 3,756,510 | 9/1973 | Nitteri | 239/130 X |

FOREIGN PATENT DOCUMENTS

229694  2/1944  Switzerland ................ 165/169

*Primary Examiner*—Sheldon Richter
*Attorney, Agent, or Firm*—Beveridge, DeGrandi & Kline

[57] ABSTRACT

A device for heating liquid for one or several washer systems.

The present invention relates to a device for heating liquid for one or several washer systems, e.g. a wind screen washer system, a head lamp washer system, a rear screen washer system, etc, including a heat exchanger, preferably connected into a return pipe from the engine of a car to the cooling system of the engine.

An object of the present invention is to accomplish a device for heating of washer liquid with high efficiency although a very simple design.

According to the present invention such a device is characterized by a heat exchanger comprising of a central flow through means connected into said return pipe and consisting of a material of high thermal conductivity, said means being of short length, and of a further flow through means connected into the piping the washer system and consisting of a material of high thermal conductivity and in that a valve means is arranged between the heat exchanger, the washer nozzle, the washer liquid container and a pump of the washer system, said valve means prevents return flow of washer liquid to the heat exchanger.

3 Claims, 5 Drawing Figures

DEVICE FOR HEATING LIQUID FOR ONE OR SEVERAL WASHER SYSTEMS

BACKGROUND OF THE INVENTION

The present invention relates to a device for heating liquid for one or several washer systems, e.g. a wind screen washer system, a head lamp washer system, a rear screen washer system, etc., including a heat exchanger, preferably connected into a return pipe from the engine of a car to the cooling system of the engine.

Known devices of this kind are disclosed in the Swedish patent application 14103/64, the German No. OS 2 112 473, the British Pat. No. 1,451,666 and the U.S. Pat. No. 2,260,904 and these known devices are subjected to several disadvantages. One of these is a relatively complicated design in relation to the effect of heating the washer liquid. The complicated design results in high manufacturing costs and unsatisfactory function, which in turn results in high maintenance costs.

One object of the present invention is to accomplish a device for heating washer liquid with high efficiency although a very simple design.

SUMMARY OF THE INVENTION

According to the present invention the above mentioned device is characterized in that the heat exchanger comprises of a central flow through means connected into said return pipe and consisting of a material of high thermal conductivity, said means being of short length, and of a further flow through means connected into the piping of the washer system and consisting of a material of high thermal conductivity and in that a valve means is arranged between the heat exchanger, the washer nozzle, the washer liquid container and a pump of the washer system, said valve means prevents return flow of washer liquid to the heat exchanger.

ADVANTAGES

According to the present invention the design of the device will be very simple and the function of the device will be very effective, reliable and can be manufactured at very low costs.

PREFERRED EMBODIMENT

Figure 1:
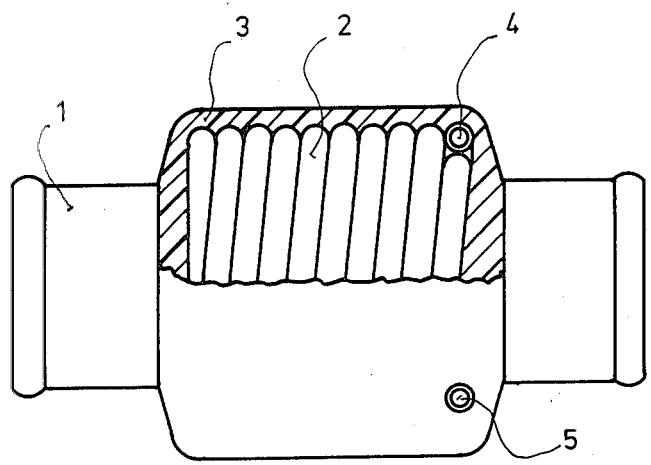
FIG. 1 shows partly in section a view of an embodiment of a device according to the present invention.
Figure 2:
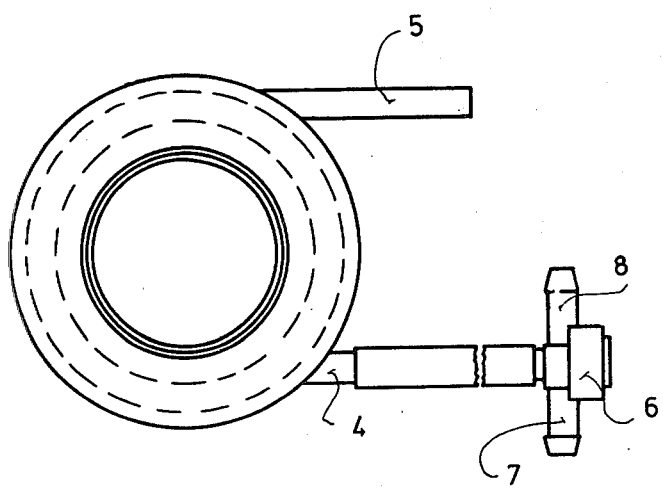
FIG. 2 shows an end view of the device in FIG. 1 and a valve means.

According to the present invention a heat exchanger as shown in FIG. 1 has a central flow through body 1 in the form of a copper tube with approximately the same diameter as the return hose between the engine of a car and the cooling system of the engine. Suitable beads are provided at the ends of the copper tube 1 for connecting the hose with a hose clamp. A further flow through means 2 in the form of a copper tube of smaller diameter than the copper tube 2 is wound close on the copper tube 1 and on itself in the outer layer. A heat insulating material 3 preferably of crimping plastic is provided outside the layers of the copper tube 2. The heat exchanger in FIG. 1 is connected into the wind screen washer system of a car in the following way. The end 4 of the copper tube 2 is positioned in the outer layer of the winding on the copper tube 1 being connected to the pump of the washer system which in turn is connected to a washer liquid container. The end 5 of the copper tube 2 positioned in the layer closest to the copper tube 1 is connected to the washer nozzle via the valve means 6 shown in FIG. 2, the angle end 7 of which is connected to the washer nozzle and the end 8 of which is connected to the washer liquid container.

Figure 3:
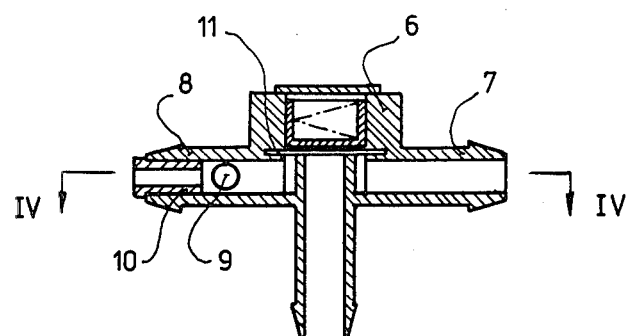
FIG. 3 shows a section through the valve means in FIG. 2.
Figure 4:
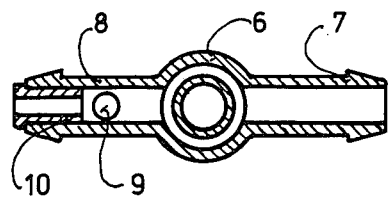
FIG. 4 shows a section along the line IV—IV in FIG. 3.

The valve means 6 in FIG. 3 and 4 has a ball 9 with a seating 10 for the ball 9 when the washer liquid pump is in function and presses washer liquid through the copper tube 2 to the washer liquid nozzle via a diaphragm 11 and the output end 7. Return liquid will flow past the ball 9 to the washer liquid container and will be prevented from flowing into the tube 2 by the diaphragm 11 springloaded against the position shown in FIG. 3.

In this way there will always be a heated volume of liquid in the tube 2, which volume of liquid is ready to be transported to the washer nozzle.

Figure 5:
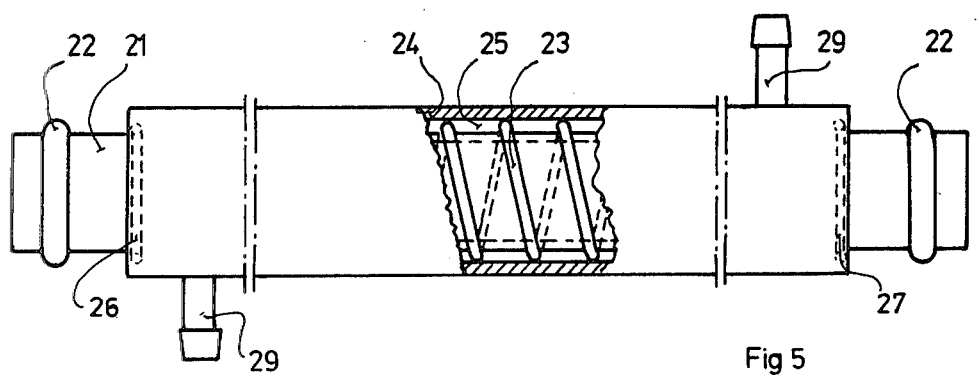
FIG. 5 shows partly in section a side view of another embodiment of a device according to the present invention.

The other embodiment according to the present invention shown in FIG. 5 comprises a tube 21, at the ends of which there are provided beads 22 to facilitate sealing against the inside of a hose, into which the tube 21 shall be connected and which might be the hose for return of the cooling water from an engine of a car to the cooling system. A wire 23 is wound on the tube 21 with high pitch. The tube 21 with the wire 23 is inserted into a further tube 24, the inner diameter of which is approximately the same as the outer diameter of the tube 21 with the wire 23. Between the tubes 21 and 24 there is provided a space 25 closed at the ends of the tube 24 by a sealing ring 26 and 27.

The wire 23 limiting the space 25 giving the space 25 the form of a thread with high pitch from the sealing ring 26 to the sealing ring 27. At the end of the tube 24 there is a connecting nipple 28 and at the other end of the tube 24 there is a connecting nipple 29. The nipples 28 and 29 are in connection with the space 25. The nipples 28 and 29 are provided for hose connection and the nipple 28 can be inserted into the end of a hose to a washer liquid container, while the nipple 29 can be inserted into the end of a hose leading direct to a washer nozzle or via a suitable valve as shon in FIG. 3 to the washer nozzle.

When washer liquid is fed into the space 25 via the nipple 28 by a pump in the washer system and the cooling water flows through the tube 21, the washer liquid will be heated during the passage through the space 25, which can be said to have the form of a flattened out tube arranged on the tube 21. The washer liquid in the space 25 will be heated very effectively and leaves the space 25 via the nipple 29.

The heat transfer from the tube 21 to the washer liquid in the space 25 will be very effective because the heat shall only pass the wall of the tube 21.

The main advantage of a device according to the present invention is the very simple design which makes it very simple to manufacture. On for instance an aluminium tube or a copper tube a wire 23 is wound with the pitch which is desired for a desired length on the space 25. The dimension of the wire 23 determines the dimension of the space 25. After the winding of the wire 23 the tube with the same is inserted into the tube 24, which can be made of any suitable material but preferably of a heat insulating material, e.g., a plastic tube, whereupon the sealing rings 26 and 27 are provided at the ends for closing of the space 25.

I claim:

1. A device for heating liquid for one or several washer systems, e.g. wind screen washer system, a head lamp washer system, a rear screen washer system, etc., including a heat exchanger, preferably connected into a return pipe from the engine of a car to the cooling system of the engine, characterized in that the heat exchanger comprises of a central flow through conduit connected into said return pipe and formed of a material of high thermal conductivity, said central flow through conduit being of short length, a further flow through conduit connected into the piping of the washer system and formed of a material of high thermal conductivity, said further flow through conduit being wound in more than one layer on said central flow through conduit and without penetrating the central flow through conduit, said further flow through conduit including a helically wound first layer and a helically wound second layer which are connected together in series, said first layer being in contact with the exterior of said central flow through conduit, said second layer being wound on and in contact with said first layer, said further flow through conduit having an inlet end positioned in said first layer which is closest to the central flow through conduit; said further flow through conduit having its outlet end positioned in said second layer which is furthest from the central flow through conduit, valve means arranged between the heat exchanger, the washer nozzle, the washer liquid container and a pump of the washer system, said valve means being operable to prevent return flow of washer liquid from the nozzle to the heat exchanger.

2. A device as claimed in claim 1, characterized in that said central conduit consists of a copper tube of approximately the same diameter as the return pipe and in that the further conduit consists of a copper tube of small diameter in relation to the first mentioned tube.

3. A device as claimed in claim 1, characterized in that said winding is covered with a heat insulating material.

* * * * *